United States Patent [19]

Liao

[11] Patent Number: 5,893,300
[45] Date of Patent: Apr. 13, 1999

[54] PEDAL PLATE ASSEMBLY OF A BICYCLE

[76] Inventor: Wan-Ming Liao, 58, Ma Yuan West St., Taichung, Taiwan

[21] Appl. No.: 08/602,034

[22] Filed: Feb. 15, 1996

[51] Int. Cl.[6] ............................................. G05G 1/14
[52] U.S. Cl. ......................... 74/594.4; 403/326; 403/361
[58] Field of Search ..................... 74/594.4, 594.5, 74/594.7, 594.1; 40/913, 316; 403/326, 327, 329, 361; 482/63

[56] References Cited

U.S. PATENT DOCUMENTS

| 520,009 | 5/1894 | Perkins | 74/594.4 |
| 1,039,354 | 9/1912 | Bonadio | 403/329 X |
| 4,338,829 | 7/1982 | Ozaki | 74/594.4 |
| 4,429,950 | 2/1984 | Zwahlem | 74/594.4 X |
| 4,813,808 | 3/1989 | Gehrke | 403/326 |
| 4,847,950 | 7/1989 | Coleman | 403/326 X |
| 5,421,556 | 6/1995 | Dodge et al. | 403/326 X |

Primary Examiner—Charles A. Marmor
Assistant Examiner—Saul Rodriguez

[57] ABSTRACT

A pedal plate assembly has a main block, a socket block, and a middle ring. The socket block has a circular recess on the connecting end of the socket block and inner recesses in the socket block. The middle ring encloses the circular recess. The main block has a tapered portion. Two opposite elongated notches are formed on the tapered portion. A plurality of click blocks are disposed on the tapered portion. Each click block is snapped in the corresponding inner recess. The socket block has a tapered interior to receive the tapered portion.

2 Claims, 5 Drawing Sheets

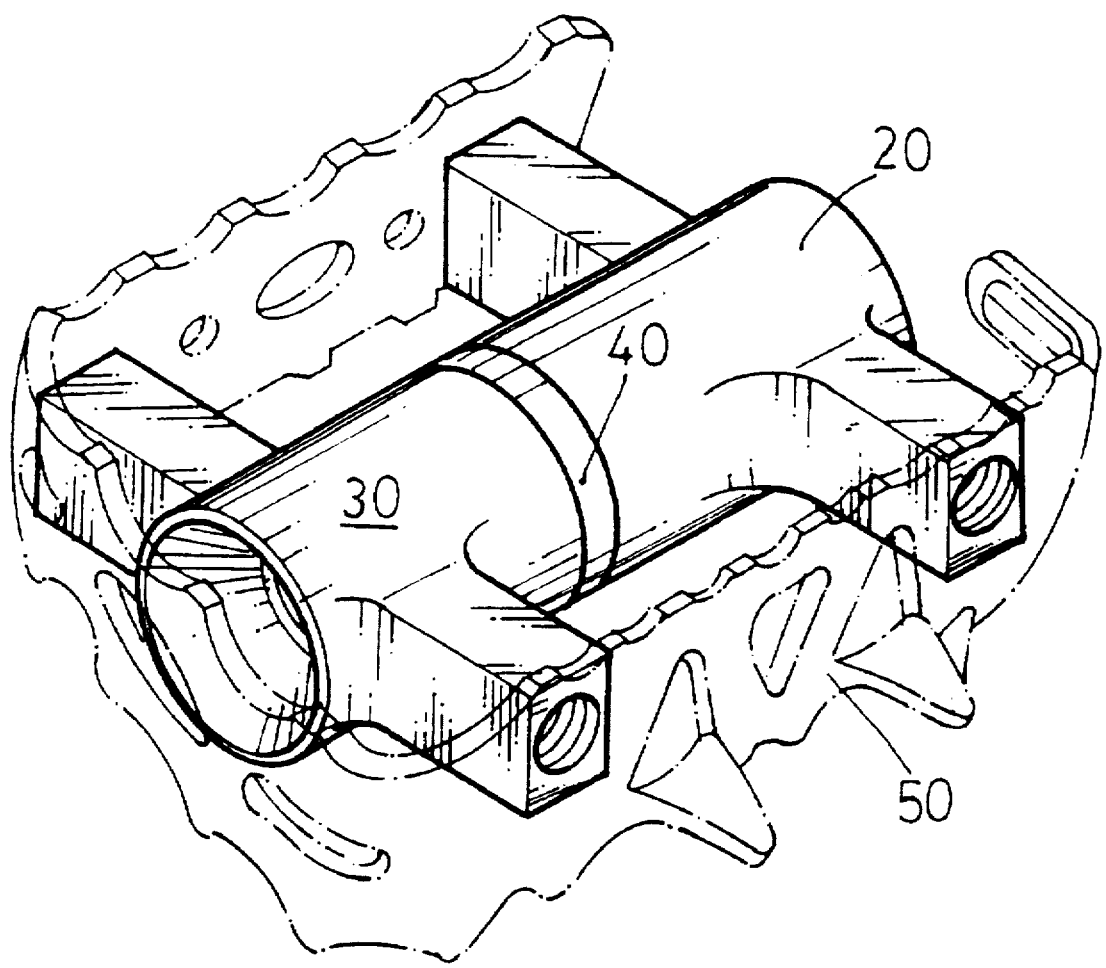
F I G. 2

PEDAL PLATE ASSEMBLY OF A BICYCLE

BACKGROUND OF THE INVENTION

The invention relates to a pedal plate assembly. More particularly, the invention relates to a pedal plate assembly for a bicycle.

Referring to FIGS. 4 and 5, a main frame 60 of a pedal plate has an upper frame 61 and a lower frame 62. The right and left molds 72 and 73 abut two overlapped aluminum plates. The upper mold 70 and lower mold 71 press two aluminum plates to form the upper frame 61 and the lower frame 62. However, it is difficult to decorate the aluminum plates. It is difficult to cast the patterns, alphabets or numerals on the aluminum plates also. The volumes of the molds 70, 71, 72 and 73 are very large, so they will occupy a large area while processing.

SUMMARY OF THE INVENTION

An object of the invention is to provide a pedal plate assembly for a bicycle which can be easily assembled.

Another object of the invention is to provide a pedal plate assembly with a middle ring so that patterns, alphabets and numerals can be engraved on the middle ring.

Accordingly, a pedal plate assembly comprises a hollow main block, a hollow socket block, and a middle ring between the main block and the socket block. The socket block has a circular recess on the connecting end of the socket block and a plurality of inner recesses in the socket block. The middle ring encloses the circular recess. The main block has a tapered portion. Two opposite elongated notches are formed on the tapered portion. A plurality of click blocks are disposed on the upper and lower peripheries of the tapered portion. Each of the click blocks has an inclined upper surface. Each of the click blocks is snapped in the corresponding inner recess. The socket block has a tapered interior to receive the tapered portion.

BRIEF DESCRIPTION OF THE DRAWINGS

FIG. 2 is a perspective assembly view of a pedal plate assembly of FIG. 1;

DETAILED DESCRIPTION OF THE INVENTION

Figure 1:
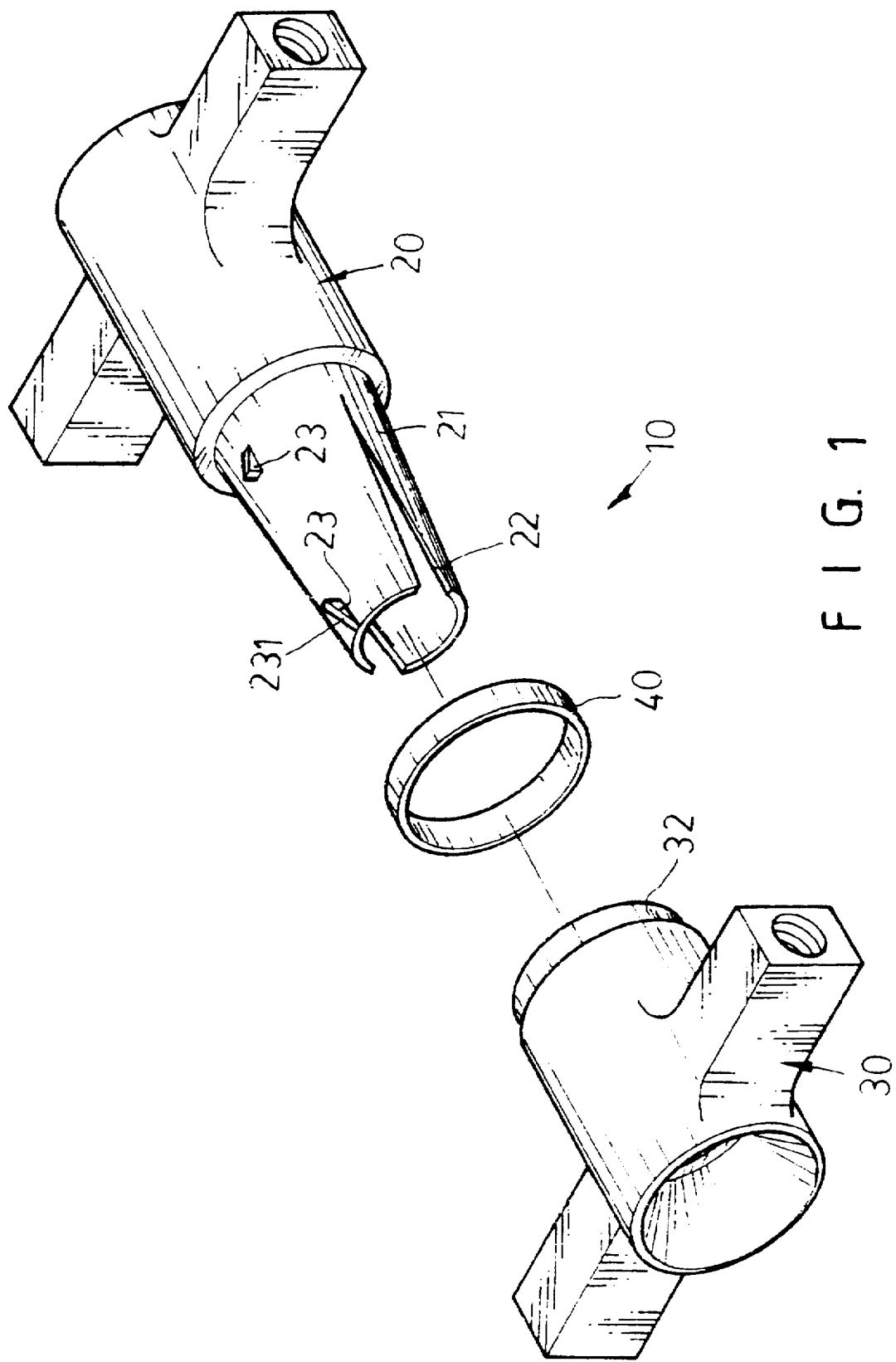
FIG. 1 is a perspective exploded view of a pedal plate assembly of a preferred embodiment in accordance with the invention.
Figure 3:
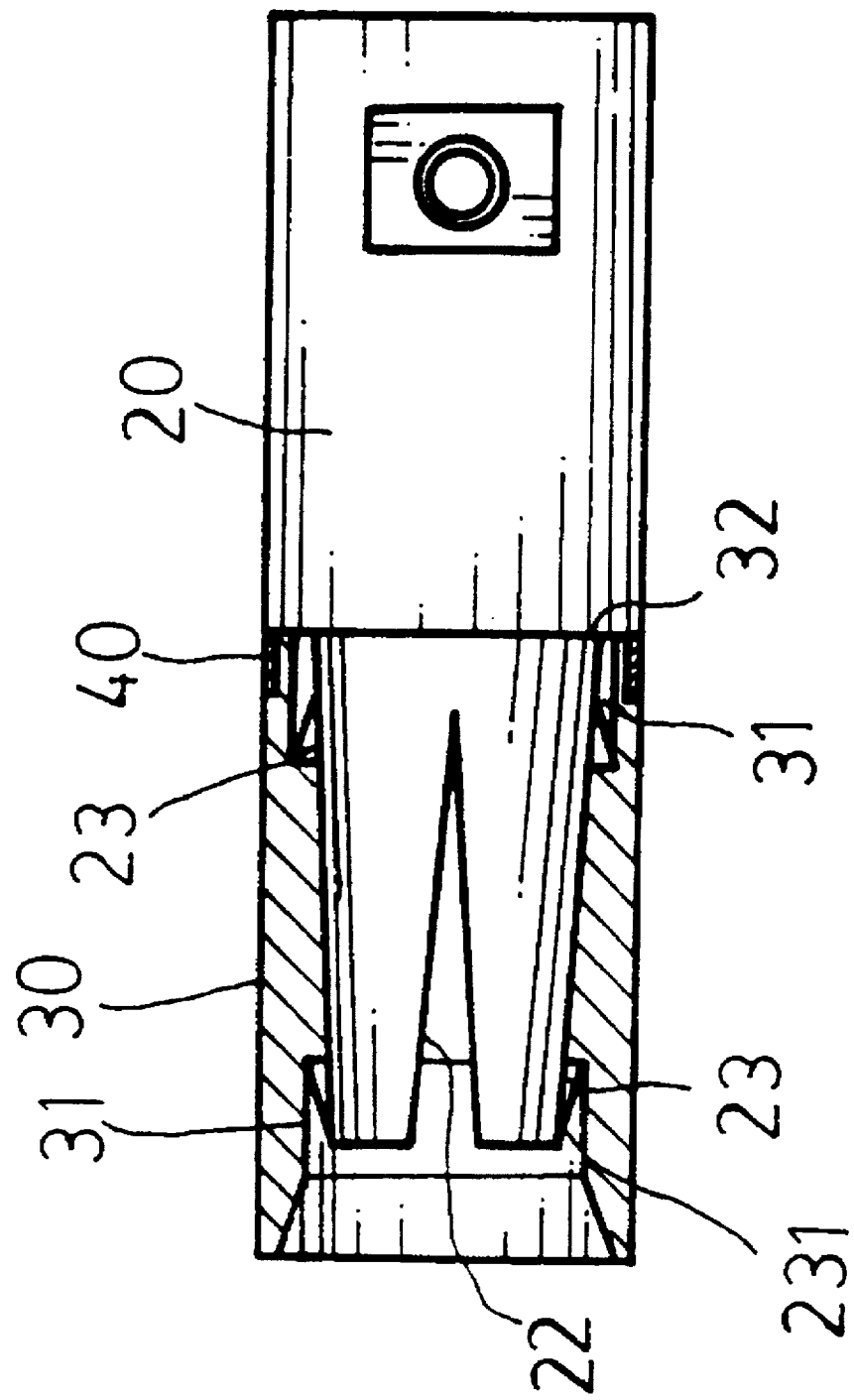
FIG. 3 is a partially cross-sectional view of FIG. 2.
Figure 4:
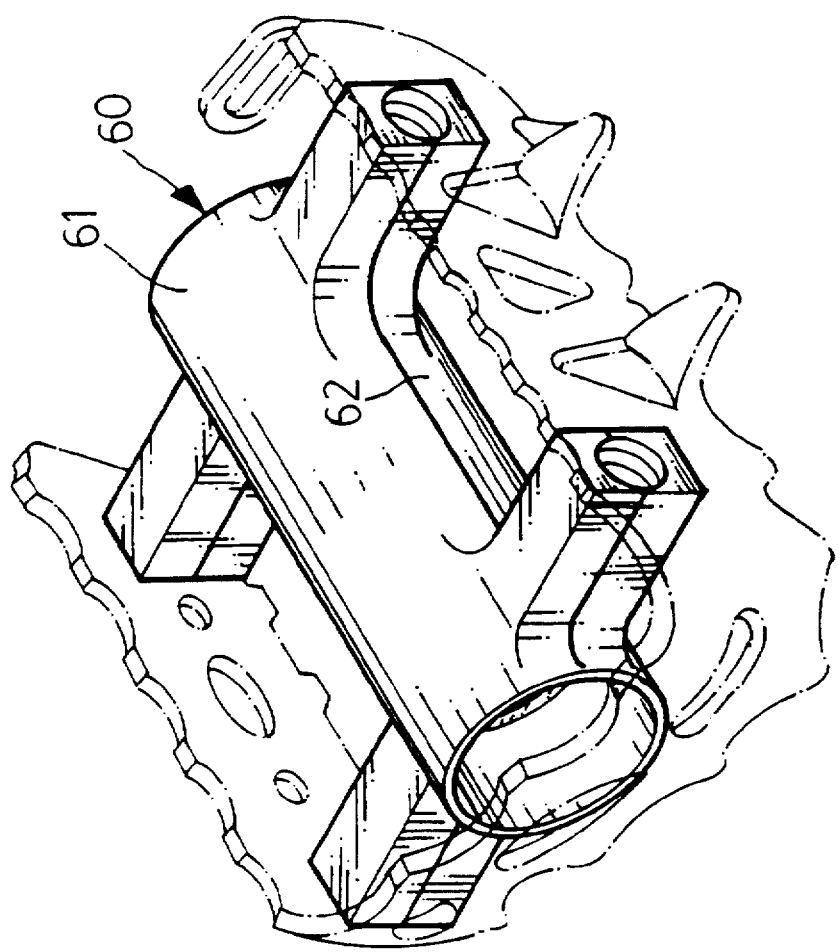
FIG. 4 is a perspective assembly view of a pedal plate of the prior art.
Figure 5:
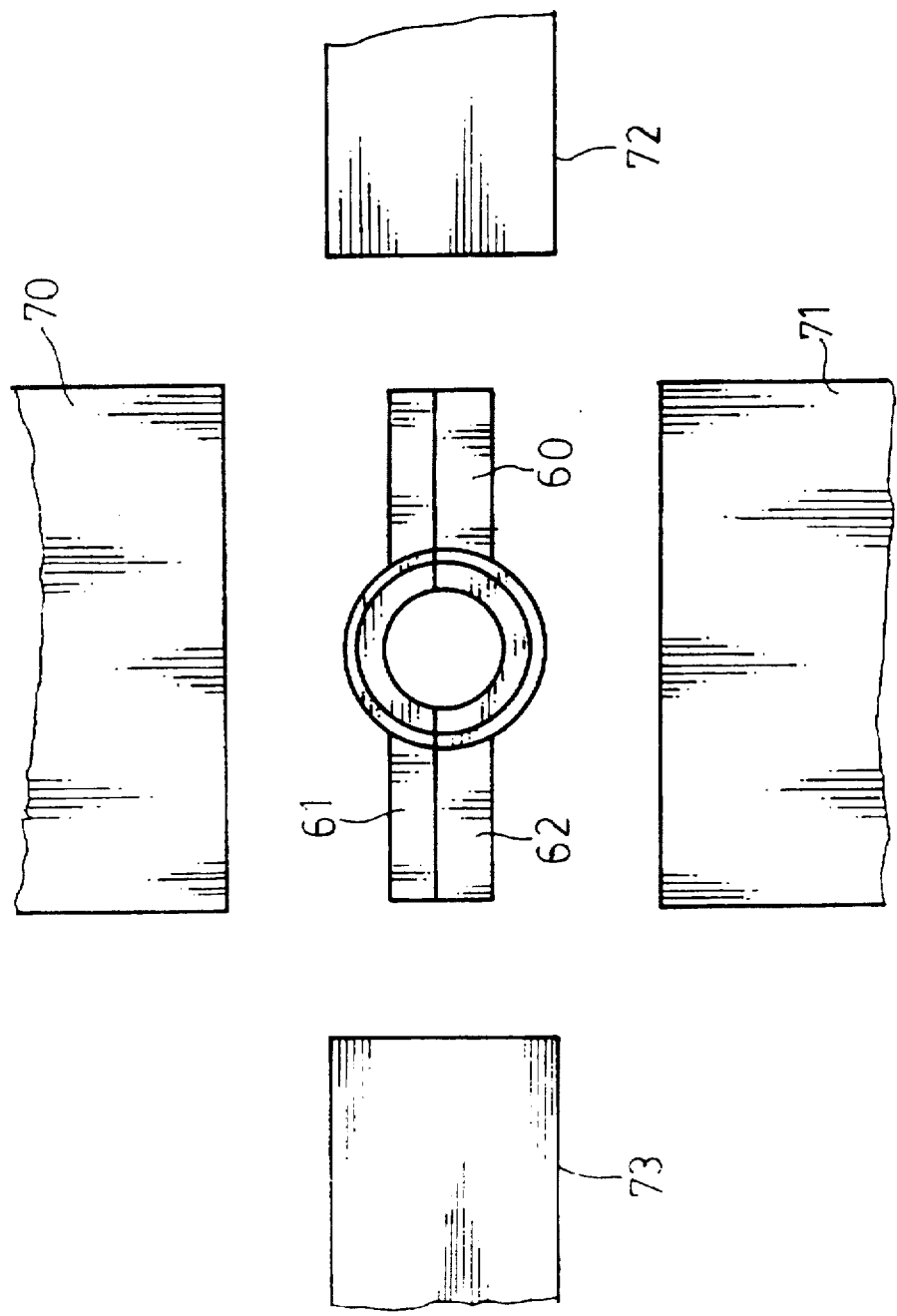
FIG. 5 is a schematic view illustrating the manufacture of a pedal plate of the prior art with a plurality of molds.

Referring to FIGS. 1 to 3, a pedal plate assembly 10 comprises a hollow main block 20, a hollow socket block 30, and a middle ring 40 between the main block 20 and the socket block 30. The socket block 30 has a circular recess 32 on the connecting end of the socket block 30 and a plurality of inner recesses 31 in the socket block 30. The middle ring 40 encloses the circular recess 32. The main block 20 has a tapered portion 21. Two opposite elongated notches 22 are formed on the tapered portion 21. A plurality of click blocks 23 are disposed on the upper and lower peripheries of the tapered portion 21. Each of the click blocks 23 has an inclined upper surface 231. Each of the click blocks 23 is snapped in the corresponding inner recess 31. The socket block 30 has a tapered interior to receive the tapered portion 21. In combination, the middle ring 40 is disposed on the circular recess 32. The tapered portion 21 is inserted in the tapered interior of the socket block 30. Thus the click blocks 23 are snapped in the corresponding inner recesses 31. Then the pedal plate assembly 10 and the side frames 50 are fastened together. Furthermore, patterns, alphabets and numerals can be engraved on the outer surface of the middle ring 40.

The present invention need not the left mold and the right mold. Since the present invention applies only two molds, the molds will not occupy too much room. The middle ring can be used for distinguishing various types and sizes of the pedal plate assembly. Further, the pedal plate assembly is easily assembled.

The invention is not limited to the above embodiment but various modification thereof may be made. Further, various changes in form and detail may be made without departing from the scope of the invention.

I claim:

1. A pedal plate assembly comprising:

a hollow main block;

a hollow socket block;

said socket block having a circular recess on a connecting end of said socket block and a plurality of inner recesses in said socket block;

said main block having a tapered portion;

two opposite elongated notches formed on said tapered portion;

a plurality of click blocks disposed on an upper and lower peripheries of said tapered portion;

each of said click blocks having an inclined upper surface;

each of said click blocks being snapped in said corresponding inner recess;

said socket block having a tapered interior to receive said tapered portion.

2. A pedal plate assembly as claimed in claim 1, wherein a middle ring encloses said circular recess to dispose said middle ring between said main block and said socket block.

* * * * *